Patented Aug. 23, 1949

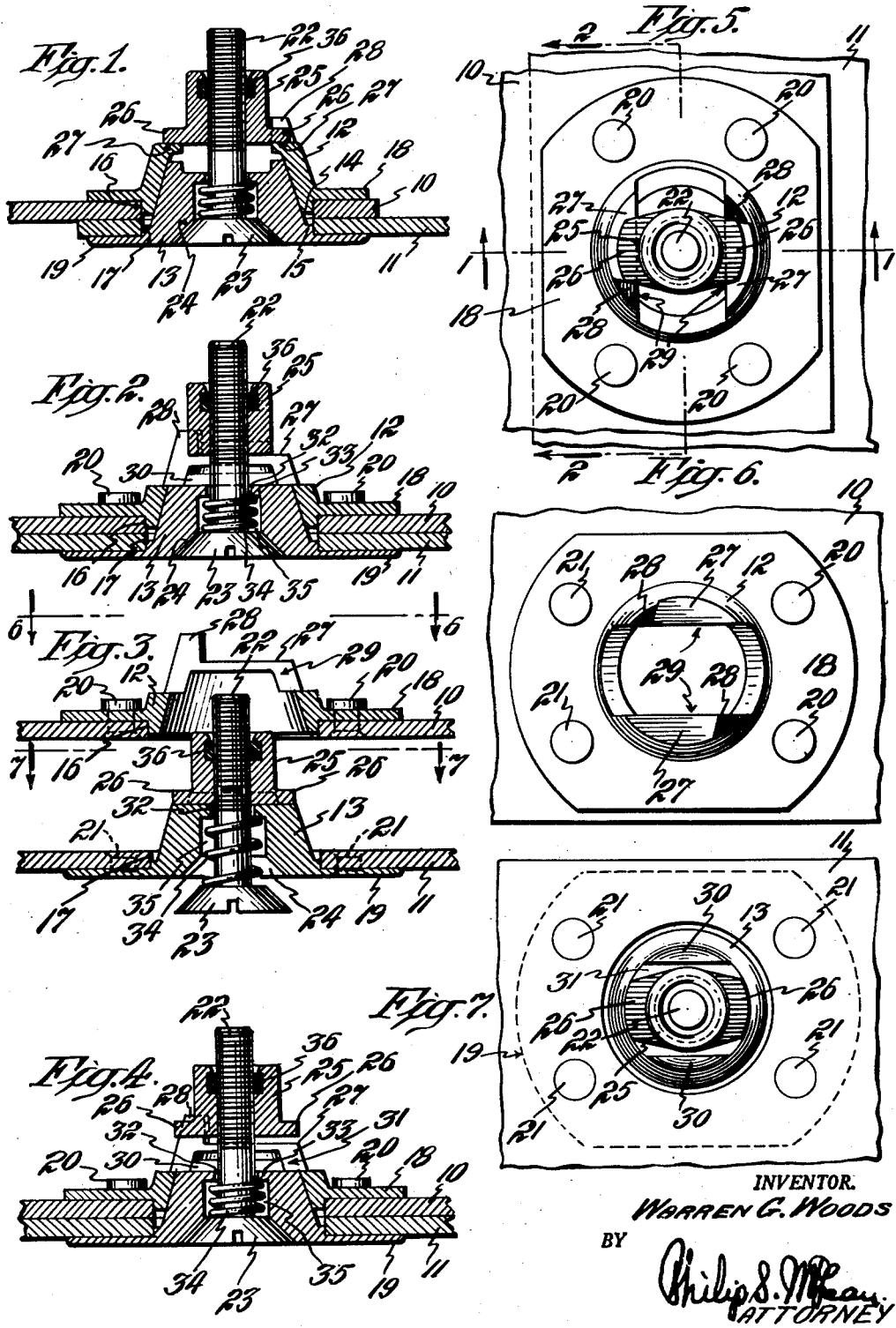

2,479,992

UNITED STATES PATENT OFFICE 2,479,992

SHEAR CARRYING FASTENER

Warren G. Woods, Wichita, Kans., assignor to Beech Aircraft Corporation, Wichita, Kans., a corporation of Delaware Application February 7, 1948, Serial No. 6,942

2 Claims. (Cl. 24—221)

The invention here disclosed relates to fasteners of the quick releasable type such as are used for securing sheet metal cover plates, cowling and the like in place on aircraft structures.

Objects of the invention are to provide a quick opening fastener which will carry shear from one structural member to another, as from a door to a companion frame structure.

Special objects of the invention are to provide such a fastener which will automatically index the connected parts and correct for misalinement.

Further objects of the invention are to provide a fastener of the nature indicated which will be of simple, rugged construction, consist of but few parts and be such as can be manufactured and installed at reasonably low cost.

Other desirable objects attained by the invention are set forth or will appear in the course of the following specification.

The drawing accompanying and forming part of the specification illustrates a present practical commercial embodiment of the invention. Structure, however, may be modified and changed within the true intent and broad scope of the invention as hereinafter defined and claimed.

Fig. 1 in the drawing is a cross sectional view of the fastener as in use, the parts appearing as on substantially the plane of line 1—1 of Fig. 5.

Fig. 2 is a similar view on a plane at right angles thereto, as on substantially the plane of line 2—2 of Fig. 5.

Fig. 3 is a broken sectional view on the same plane showing the parts in separated relation.

Fig. 4 is a similar view showing the parts engaged and the fastener ready to be tightened.

Fig. 5 is a plan view of the fastener as it appears at the inside of the connected parts.

Figs. 6 and 7 are broken plan views respectively of the inner, socket member and the outer, stud member of the fastener.

In the several views the parts to be connected are indicated as inner and outer layers 10, 11 of sheet metal such as employed in aircraft structures.

The shear load carrying members of the fastener comprise the companion interfitting conical socket and stud members 12, 13, these having annular base portions 14, 15 by which they are centered in their mounting openings 16, 17 and laterally extending flanges 18, 19 by which they are secured by rivets 20, 21, or otherwise, to their respective structural elements.

The shear elements are drawn together by a screw 22 extending inward through the conical stud with its head 23 seating in a conical socket 24 in the outer face of the stud and a nut 25 on the inner end of the screw having laterally projecting wings 26 bearing on the segmental lands 27 at the inner end of the conical socket member 12.

Diagonally opposite stops 28 at the ends of the lands, when engaged by the wings 26, hold the nut as the screw is turned in the tightening direction.

The transverse slot 29 at the inner end of the socket member between the opposed segmental lands 27 is wide enough to pass the winged nut when the latter is alined therewith, as will be clear from consideration of Figs. 5 and 6.

The hollow stud member 13 has spaced opposed segmental shoulders 30 at the inner end of the same, separated by a transverse groove 31 of greater width than the winged nut, as shown in Fig. 7.

The screw opening 32 in the inner closed end 33 of the conical stud 13 preferably is enough larger than the screw to permit the screw to have a rocking as well as free axial movment through said stud.

A spring 34 beneath the head of the screw and received within the chamber 35 within the hollow stud, bearing against the inner end wall 33 operates to thrust the screw outwardly to the extent permitted by the location of the nut on the screw when the parts are separated as in Fig. 3.

Further, the spring 34 has the faculty of retaining the wing nut seated in the slot 31 between shoulders 30 at opposite sides of the same, as indicated in Figs. 3 and 7, thus to hold the nut while the screw may be turned in either direction either to back it out or screw it further into the nut, this particularly for positioning the nut on the screw preparatory to engaging the parts and to hold the nut lined up with the cross slot at 29 in the inner end of the socket.

The nut 25 is shown as carrying a friction washer 36 designed to yieldingly hold it to turn with the screw. This is of advantage in locating the nut in the holding slot 31 at the inner end of the stud when the parts are being engaged and of advantage in turning the nut back to aline with the slot 29 at the inner end of the socket when the parts are to be released.

The conical tapered structure of the stud facilitates the indexing of the two parts and corrects for slight variations in alinement. The cupped formation of the conically formed stud and socket members provides ample strength for carrying all shear loads and in a relatively light, small sized structure. The closed or partially closed inner end construction of the conical stud and socket greatly strengthens these parts and provides as well for holding the nut against turning at the inner end of the stud, Fig. 3, and for the lands 27 taking all the tension that can be applied by the screw. The segmental portions 30 at the inner end of the conical stud and segmental portions 27 at the inner end of the socket serve effectively as reinforcements for these heavy load carrying members.

The lands 27 may be slightly inclined to cam the nut inward in the screw tightening operation and may therefore be considered as camming lands. The cupped formation of these camming lands provides strength ample for holding the joined panels in accurate alinement.

The fastener consists of but few parts and these of simple, rugged construction. The structure is easily installed and initial as well as installation costs are low.

What is claimed is:

1. A shear carrying fastener comprising companion conical stud and socket members, said socket member having spaced segmental lands at the inner end of the same, terminating in stops and separated by a transverse slot and the conical stud having spaced segmental shoulders at the inner end of the same separated by a transverse groove of approximately the same width and positioned to substantially register with the transverse slot, a screw extending inward through the stud member, a nut on the inner end of said screw having wings transversely extended to ride over the segmental shoulders at the inner end of the socket member into engagement with said stops, said winged nut being of a size to pass through the slot at the inner end of the socket member and to seat in said transverse groove at the inner end of the stud member when positioned with the wings of the same in line with said slot and groove and a spring located within said conical stud member and thrusting the screw outward to hold the winged nut seated in said groove in the inner end of said conical stud.

2. A shear carrying fastener comprising a conical socket member having camming lands at the inner end of the same terminating in diagonally oppositely disposed stops, a hollow conical stud member having self-alining engagement in said conical socket, a screw extending through said hollow stud member and a nut on the inner end of said screw of a width to pass within said lands and having laterally extended wings to engage over said camming lands and abut said stops, said hollow conical stud having a chamber therein about the screw and a spring seated in said chamber and tensioning said screw outwardly to hold said winged nut back against the inner end of said conical stud and said conical stud having a transverse groove across the inner end of the same to receive and key said nut against turning while so held against the back of the conical stud and said nut having frictional engagement on said screw and whereby the nut may be turned with the screw to line it up with the transverse groove to hold the nut while the screw is backed out of the same.

WARREN G. WOODS.

REFERENCES CITED

The following references are of record in the file of this patent:

UNITED STATES PATENTS

| Number | Name | Date |
| --- | --- | --- |
| 2,095,271 | Swanstrom | Oct. 12, 1937 |
| 2,315,335 | Kane | Mar. 30, 1943 |
| 2,239,125 | Summers | Apr. 22, 1941 |
| 2,368,799 | Barlow | Feb. 6, 1945 |
| 2,378,122 | Barlow | June 12, 1945 |
| 2,385,180 | Allen | Sept. 18, 1945 |